United States Patent [19]

Edmonds et al.

[11] Patent Number: 4,866,668

[45] Date of Patent: Sep. 12, 1989

[54] MULTIPLE MEMORY LOADING SYSTEM BASED ON MULTILEVEL LISTS

[75] Inventors: Mark P. Edmonds, Brasschaat; Anthony Donegan, Antwerp, both of Belgium

[73] Assignee: Alcatel N.V., Amsterdam, Netherlands

[21] Appl. No.: 178,887

[22] Filed: Mar. 30, 1988

Related U.S. Application Data

[63] Continuation of Ser. No. 740,357, Jun. 3, 1985, abandoned.

[30] Foreign Application Priority Data

Jun. 1, 1984 [EP] European Pat. Off. ........ 84200783.3

[51] Int. Cl.$^4$ ............................................... H04Q 3/00
[52] U.S. Cl. .................................. 364/900; 340/825.02
[58] Field of Search ..................... 340/825.02; 370/94, 370/60; 364/200 MS File, 900 MS File, 300

[56] References Cited

U.S. PATENT DOCUMENTS

| | | | |
|---|---|---|---|
| 4,320,500 | 3/1982 | Barberis | 370/94 |
| 4,347,498 | 8/1982 | Lee | 340/825.02 |
| 4,418,396 | 11/1983 | Hemdal et al. | 364/900 |
| 4,525,830 | 6/1985 | Cohen | 370/94 |
| 4,535,450 | 8/1985 | Tan | 370/94 |
| 4,550,397 | 10/1985 | Turner | 370/94 |

FOREIGN PATENT DOCUMENTS

WO83/02209 4/1983 PCT Int'l Appl. .

OTHER PUBLICATIONS

"ITT 1240 Digital Exchange Hardware Description," by Das, *Electrical Communication*, vol. 56, No. 2/3, 1981, pp. 135–147.

Enhanced Message Addressing Capabilities for Computer Networks, Proceedings of IEEE vol. 66, No. 11, 11/1978, pp. 1517–1527.

*Computer Networks*, by A. S. Tanenbaum, copyright 1981, pp. 114–119, 198–203.

ITT 1240 Digital Exchange Software Concepts and Implementation by L. Katzschner et al.

*Primary Examiner*—Lawrence E. Anderson
*Attorney, Agent, or Firm*—Christie, Parker & Hale

[57] ABSTRACT

A multiple memory loading system with a plurality of intercoupled modules including memories able to transmit each of a plurality of data packets to the memories of a number of modules wherein said data packet may then be stored. The transmission of each of the data packets from one module only occurs to the memories of a number of predetermined modules of an initial set and indirectly from said memories to memories of other modules.

12 Claims, 3 Drawing Sheets

MULTIPLE MEMORY LOADING SYSTEM BASED ON MULTILEVEL LISTS

This application is a continuation of Ser. No. 740,357, now abandoned.

FIELD OF THE INVENTION

The present invention relates to a multiple memory loading system with a plurality of intercoupled modules including memories and processing means and at least one of which is able to transmit each of a plurality of data packets to the memories of a number of modules wherein said data packet may then be stored.

BACKGROUND ART

Such a system is already known from the international patent application WO 83/02209 published under the Patent Cooperation Treaty. Therein each of said data packets is simultaneously transmitted from one module to all the modules to be loaded. But each of these modules has previously been so conditioned that it is only able to accept predetermined ones of these data packets. Such a conditioning operation has to be individually performed for each module and is therefore time consuming. This time may be relatively high in accordance with the number of terminal modules, as is the case for instance in an automatic telecommunication switching system with distributed processor control such as described in various articles published in Electrical Communication, Volume 56, No 2/3, 1981, and particularly on pp. 135 to 160 and 173 to 183.

DISCLOSURE OF INVENTION

An object of the present invention is to provide a multiple memory loading system of the above type, but which permits a faster loading of the module memories.

According to the invention this object is achieved due to the fact that the transmission of each of said data packets from said one module only occurs directly to the memories of a number of predetermined modules of an initial set and indirectly from said memories to memories of other modules.

Another characteristic feature of the present system is that the transmission of said data packet to said number of predetermined modules of an initial list, storing the identities of the modules of said initial set, constitutes the first step of an iterative process each step of which consists in transmitting said packet from a source module storing a list of the identities of the modules of a set to a number of predetermined destination modules of respective sublists of said list, together with said respective sublist and in storing said data packet in the memory of said predetermined destination module which during a following step becomes the source module and then uses said sublist.

A further characteristic feature of the present system is that said one module is adapted to transmit said data packets successively to a number of predetermined modules of respective initial lists of said modules.

Yet another characteristic feature of the present system is that said data packet is simultaneously transmitted to said number of predetermined modules.

As soon as the one module has transmitted a data packet directly to each of a number of predetermined modules of an initial set together with a respective sublist of the modules to be loaded by this predetermined module, the one module may immediately start the transmission of another data packet to a number of predetermined modules of another initial set, since in the former initial set the memory loading operation of the other modules may be performed with the help of the received sublist and independently from the one module. Thus a fast loading operation of the various data packets from the one module in the respective initial sets is ensured, and the speed of the loading operation is further enhanced by the fact that during each step the predetermined modules are loaded simultaneously.

A further characteristic feature of the present system is that during each of said steps said initial list is transmitted to said predetermined modules together with parameters permitting to derive said sublists from said initial list.

Still another characteristic feature of the present system is that during each of said steps also a parameter is transmitted to each of said predetermined modules enabling it to derive from said initial list the same sublists as those derived from said initial list by said one module during said first step of said iterative process, and that after its memory has been loaded said predetermined module derives said same sublists from said initial list and attempts during an additional memory loading operation to load said data packet into homologous modules of these sublists.

Still another characteristic feature of the present system is that said modules are intercoupled through a switching network.

In this way, during the additional memory loading operation homologous modules in the sublists attempt to load each other's memory. This means that the memory loading of each module is attempted during the iterative normal loading process as well as at least once during the additional loading operation. These attempts are performed by different modules and therefore also through different paths of the switching network. A module which had not been loaded during the normal loading process, e.g. due to a preceding module being faulty, may now possibly be loaded by another module, thus isolating the effect of such a fault. Thus the additional loading operation considerably enhances the reliability of the system.

The present invention also relates to a multiple memory loading system such as defined in the first paragraph of the present specification and characterized in that it includes at least two of said one modules which each are adapted to load respective data packets of said plurality into the memories of predetermined modules of respective sets and that after any of them has finished its loading operation it attempts to perform the loading operation normally executed by the other one module.

Another characteristic feature of the present invention is that the memory of each of said modules to be loaded stores a phase indicator which is brought in a predetermined condition when this memory has been loaded with said data packet and which then prevents a renewed loading of said memory.

Because the memory loading operation is shared by two modules the speed of this operation is enhanced. Moreover, since each of these modules, after having performed its job, attempts to load the module memories normally to be loaded by the other module the reliability of the system is considerably increased. Finally, by the presence of the phase indicator no time is spent to load memories which were already loaded.

BRIEF DESCRIPTION OF THE DRAWINGS

The above mentioned and other objects and features of the invention will become more apparent and the invention itself will be best understood by referring to the following description of an embodiment taken in conjunction with the accompanying drawings in which.

BEST MODE FOR CARRYING OUT THE INVENTION

Figure 1:
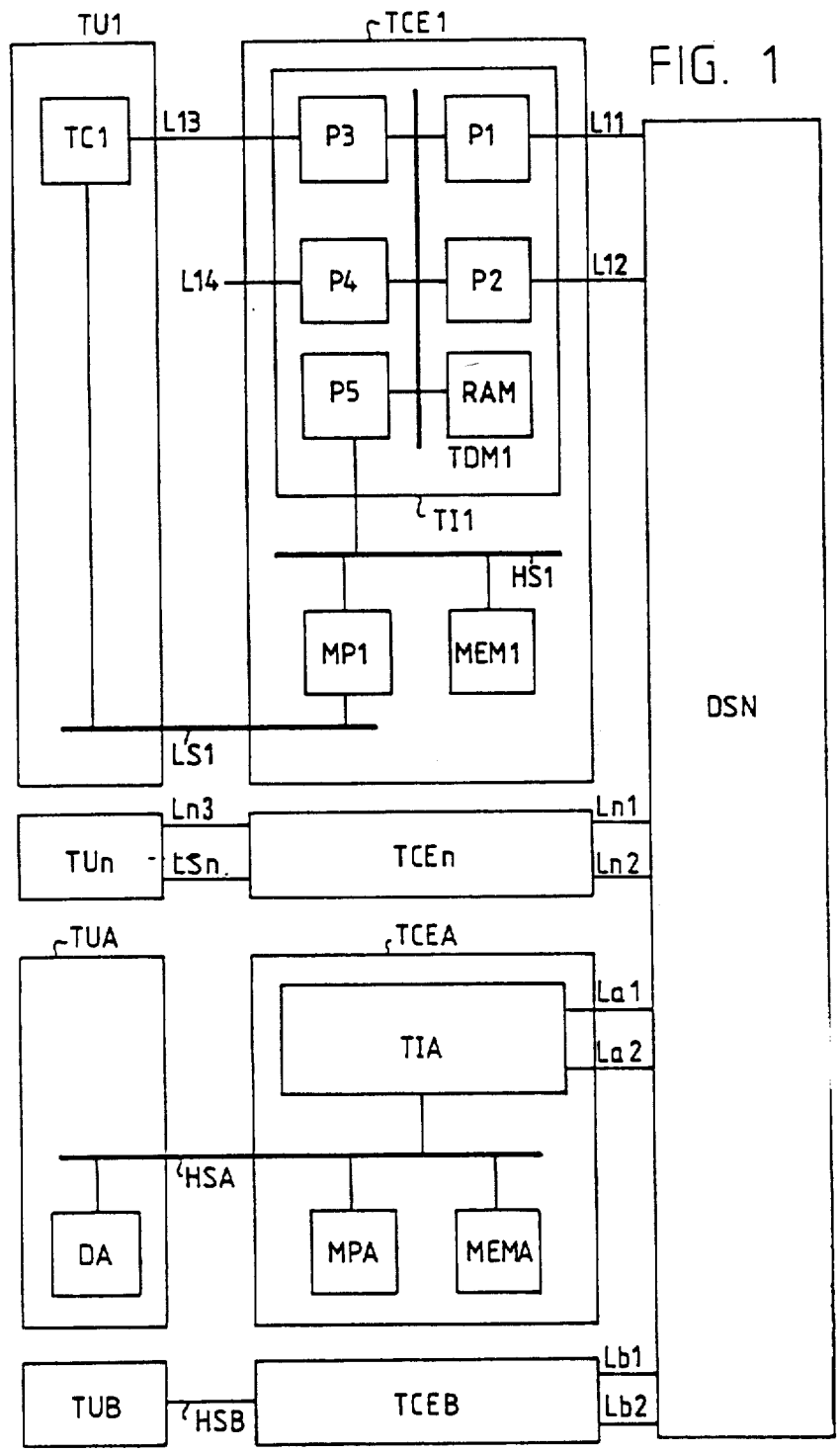
FIG. 1 is a schematic view of a multiple memory loading system according to the invention.

The present multiple memory loading system forms part of an automatic telecommunication switching system of the type described at length in the above mentioned number of Electrical Communication, and more particularly in the following articles thereof to which reference is made: "Hardware Description" by S. Das et al, pp. 135-147; "Digital Switching Network" by J. M. Cotton et al pp. 148-160 and "Software Concepts and Implementation" by L. Katzschner et al, pp. 173-183. Reference is also made to U.S. Pat. No. 4,418,396.

This multiple memory loading system includes a plurality of terminal modules or terminal control elements TCE1 to TCEn and TCEA and TCEB which are all coupled to a digital switching network DSN. The control elements TCE1 to TCEn are all identical and therefore only TCE1 is shown in relative detail. The same is true for TCEA and TCEB of which only TCEA is represented in some detail.

The digital switching network DSN is a four-stage network and the network address of each control element is a four digit number ABCD by means of the digits of which a connection may be set up through the respective stages of the network. Connections between control elements only penetrate into the network as far as necessary. For instance, to establish a connection between the control elements with addresses 6231 and 1331 the stages 4 and 3 are not used since the D and C digits of these addresses are equal. This means that these control elements are close to each other in the network. On the contrary, if these addresses are for instance 6231 and 1342 all the stages are involved in the connection between the control elements.

In the following only TCE1 and TCEA are described. Terminal control element TCE1 includes a terminal interface TI1, a microprocessor MP1 and a memory MEM1 which are all able to communicate via a high speed bus HS1 operating at 64 Megabit/sec. The terminal interface TI1 includes a RAM memory and five ports which are all connected to a time division multiplex bus TDM1. The two ports P1 and P2 are connected to the digital switching network DSN through links L11 and L12 respectively, whilst the two ports P3 and P4 are each connected to respective ones of two terminal units. More particularly, link L13 connects port P3 to a terminal circuit TC1 in terminal unit TU1 which is for instance connected to a plurality of subscriber lines or trunk lines (not shown), as well as to a low speed bus LS1 to which also microprocessor MP1 has access. This bus operates at 64 kilobit/sec. Finally, port P5 connects the high speed bus HS1 to the time division multiplex bus TDM1.

Terminal control interface TCEA which is similar to TCE1/n and includes a terminal interface TIA which is connected to DSN through links La1 and La2, a microprocessor MPA and a memory MEMA which are all able to communicate via a high speed bus HSA. However, the latter bus HSA is now connected to a data storage disc DA in a terminal unit TUA.

All the above mentioned links are bothway links used on a TDM basis with 32 channels for each direction, 30 of which are used for data transmission. The remaining 2 serve for synchronization and signalling purposes. Hence a total of 60 effective incoming and outgoing data channels is available between each terminal control element and DSN.

The unit comprising TCEB and TUB is similar to the unit TCEA, TUA and each of them is used for loading data packets into the memories of respective groups of the control elements TCE1 and TCEn. As these two units share the work load they speed up this data packet loading operation. They also increase the reliability of the system since each of them is able to perform the loading operation of all these memories on its own. The data packets to be loaded by TCEA, TUA and TCEB, TUB are stored on each of the discs DA and DB and comprise a number of m application programmes GLS1 to GLSm (Generic Load Segments) to be loaded in m corresponding sets of control elements of TCE1/n as well as specific data packets DLS1/n to be loaded in respective ones of these control elements. These two loading operations and a subsequent restart operation are successively performed in three distinct operation phases $\phi$, 1 and 2, as will become clear later.

The data packet loading operation is performed under the control of a fast load initialization programme (FLINIT) and a fast load programme proper (FLOAD) stored in the memories of TCEA and TCEB, and of a multichannel cascading programme MCC stored in the memories of each of the control elements TCE1 to TCEn together with a phase indicator PI, (FIG. 3) to indicate the last mentioned operation phases. More particularly, and as will be explained in detail later, each of the programmes GLS1 to GLSm is transmitted directly and simultaneously to the memories of a number, say 4, of predetermined terminal control elements of a corresponding initial set under the control of the programmes FLINIT and FLOAD and from these predetermined modules this application programme is transmitted or cascaded to the other terminal control elements of the initial set in iterative steps under the control of the programmes MCC of these control elements.

The transmission of data packets and the communication between the control elements TCEA, TCEB and TCE1 to TCEn is performed by means of messages. Each of these messages is prepared by the microprocessor of a source control element under the control of the programme stored in the memory thereof, and under the control of the same programme the microprocessor then registers this message in the RAM memory and finally transmits it from this memory to a destination control element. For instance, MP1 controlled by MCC stored in MEM1 prepares a message and stores it in RAM via HS1, P5 and TDM1 and afterwards transmits it on link L11 or L12 via TDM1 and P1 or P2 respectively.

To be noted that to speed-up a loading operation the communication by means of messages is basically unidirectional from source to destination. Indeed, the sole backward communication is performed by negative acknowledgement signals (NAK) which are normally used to signal a failure, e.g. when the phase indicator of a message is different from that of a destination control element or if such a control element is not available.

The messages used are:

OPEN: a message used to open a channel of a link to be used for memory loading. This message includes a phase indicator and the identities of the source and destination control elements of the message. This message is only stored in the memory of the destination control element if the phase indicator of this message equals the phase indicator PI stored in the memory of this control element;

CASCADE: a message used to order a destination control element of a set having received a data packet in its memory to transmit or cascade this packet to the memories of other control elements of this set. Details of this message will be given later;

LOCATE: a message used to define the start address of a data packet in the memory of a destination control element. This message may itself contain data;

DATA: a message containing data only;

LOCK: a message ordering the lock-out of unopened channels by putting them in the maintenance state wherein no messages can be written in the RAM of this element.

The loading of the memories of the data packets GLS1/m in the memories of the various TCE1 to TCEn is described in detail below. To this end only the unit TCEA, TUA is considered. To be noted that TCEA as well as TCEB have a very low network address because the above mentioned selection bits A, B and C thereof are 0.

Figure 2:
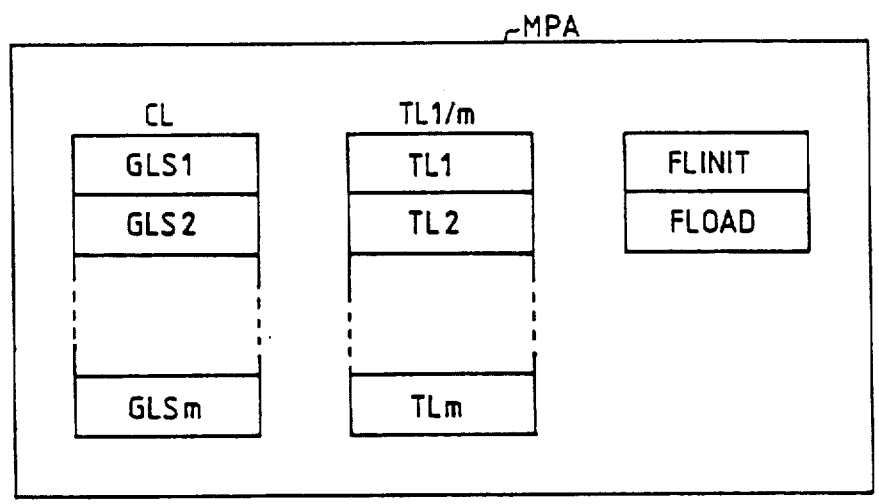
FIGS. 2 and 3 show parts of the memories MPA and MP1 of FIG. 1 respectively.
Figure 3:
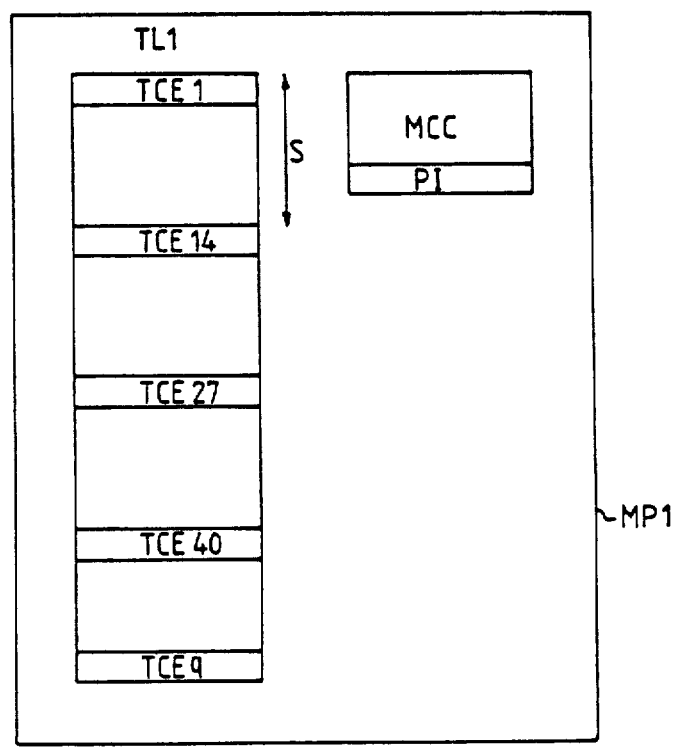

When the programme FLINIT stored in memory MEMA of TCEA runs, the following lists are set up in the memory MEMA:

a control list CL (FIG. 2) wherein the data packets GLS1 to GLSm are ordered in such a way that the number of iterative steps required to load these programmes, i.e. the cascading time, decreases from top to bottom;

m task lists or initial lists TL1 to TLm (FIG. 2) providing the identities or addresses of the control elements forming part of the above mentioned m sets of control elements into which the data packets GLS1 to GLSm have to be loaded respectively. In each such task list the terminal control elements of the corresponding set are ordered with their network addresses decreasing from top to bottom. This is done to minimize the danger of blocking in the switching network DSN during cascading, as will be explained later. FIG. 3 represents task list TL1 in more detail: it stores the network addresses of the q TCEs, TCE1 to TCEq with e.g. q=50, whose memories have to be loaded with the programme GLS1.

After having performed the programme FLINIT, the unit TCEA, TUA executes the programme FLOAD which comprises itself a fast load input from disc programme FLOID and a fast load output to network programme FLOON.

Under the control of the programme FLOID of TCEA, the odd numbered application programme GLS1 indicated by the control list CL (FIG. 2) is first read from disc DA into memory MEMA via the high speed bus HSA. Afterwards the programme FLOON of TCEA controls the loading of this programme GLS1 simultaneously into a number of predetermined control elements of the corresponding set TCE1/q. TCEA then starts reading the following odd numbered application programme GLS3 from disc DA and transmits it simultaneously to predetermined control elements of a corresponding set of control elements, etc. During the operation of TCEA, the unit TCEB, TUB successively reads the even numbered application programmes GLS2, GLS4, . . . etc. from disc DB and transfers them to predetermined corresponding sets of control elements. Obviously by proceeding in this way the loading operation is speeded up.

Figure 4:
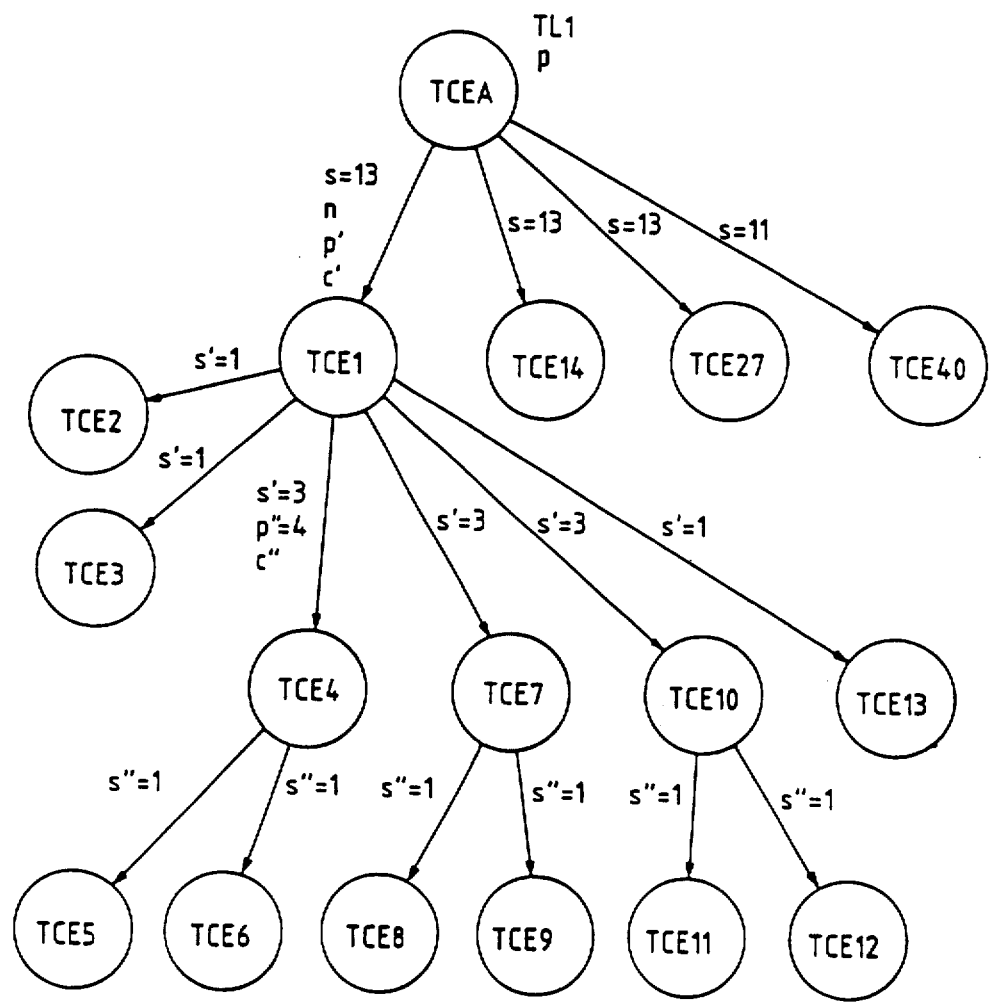
FIG. 4 illustrates the operation of the system of FIG. 1.

In the following only the loading of programme GLS1 in TCE1/q is considered reference being particularly made to FIG. 4. Hereby it is assumed that the phase indicator PI of all these control elements in on $\phi$, meaning that nothing is loaded in their memories.

The programme FLOON gets from the memory MEMA the task list TL1 as well as the maximum number p of predetermined TCEs to be simultaneously loaded by TCEA and the maximum number c of channels to be simultaneously used for transmission of GLS1 to each of these TCEs. The latter number c depends on the size of the RAM and is for instance at most equal to 15. In this case and because 60 channels are available p is equal to 4.

If p is greater than or equal to the length q of TL1, the programme FLOON can load the memories of TCE1 to TECq in one go. It launches c OPEN messages on c channels to each of these TCEs and waits on each channel during a predetermined time interval for a negative acknowledgement signal NAK which is for instance received when the phase indicator of the message is different from that stored in the TCE or when the channel or the TCE itself is not available. A LOCK message is sent to each of the available TCEs to tell the programme MCC in these TCEs to put unopened channels in the maintenance state.

On the contrary, if p is less than the length q of task list TL1, then GLS1 is transferred or cascaded from memory MEMA of TCEA to the memories of TCE1 to TCEq in several iterative steps. To this end the programme FLOON of TCEA first divides the task list TL1 of length q into a number of at most p primary sublists at least two of which have a maximum length s. In this way each control element of a sublist has at least one homologous partner in the other sublist(s). This fact is exploited in an additional loading operation performed to increase the reliability of the system, as explained in detail later.

The above maximum length s could be obtained by taking the rounded up value of s=q/p, but because the processor of a control element is only able to calculate the rounded down value of a quotient and also in order to obtain a correct value if the quotient q/p is an integer value, one first adds 1 to q/p and then subtracts $-1/p$ before rounding down. The processor therefore calculates the rounded down value of the expression $$S = \frac{q+p-1}{p}$$

All p primary sublists of TL1 are then given the same length s, apart from the last which is given the length q−s (p−1) and may be shorter than s. For instance, when q=50 and p=4 then 4 primary sublists TCE1/13, TCE14/26, TCE27/39 and TCE40/50 having a length s equal to 13, 13, 13 and 11 respectively are formed.

Assuming such a division, the programme FLOON of TCEA then selects the first TCEs of the p primary sublists TCE1/13, 14/26, 27/39 and 40/50 and launches c OPEN messages on c channels to each of these predetermined TCEs and waits on each channel during a predetermined time interval for a negative acknowledgement signal NAK.

Supposing that all c=15 channels to each of the predetermined or first terminal control elements TCE1, TCE14, TCE27 and TCE40 of the above sublists are available, the programme FLOON of TCEA successively sends to each of these a LOCK message and also a CASCADE message which comprises:
a phase indicator;
the location in memory wherein the task list TL1 is to be found at the end of a loading operation;
the number s (13, 13, 13 or 11) of TCEs contained in the sublist TCE1/13, 14/26, 27/39, 40/50 starting with the TCE1, 14, 26, 40 under consideration;
a divisor n=p to be used during an additional loading operation to be described later;
the maximum number p' of TCEs to which data may be simultaneously transmitted from the TCE under consideration;
the maximum number c' of channels to be used for this data transmission.

The programme FLOON of TCEA then sends to each of the above mentioned four predetermined TCEs LOCATE messages containing the location of the memory wherein data has to be stored. These data comprise the task list TL1 and GLS1 and are transmitted by these LOCATE messages and by DATA messages.

To be noted that TL1 and GLS1 are sent to each control element in packets, each packet being subdivided in c parts which are transmitted independently on the c channels. As a consequence, the transmission speed of these packets is c times larger than the channel speed which is for instance equal to 8 kbyte/sec.

Upon receipt of the messages LOCK, CASCADE, LOCATE and DATA the programme MCC in the predetermined TCEs, TCE1, TCE14, TCE27 and TCE40 puts all unopened channels in the maintenance state and stores the task or initial list TL1, the application programme GLS1 and the parameters s (13, 13, 13, 11), n=p, p' and c' in its memory. It also changes its phase indicator PI to 1 indicating that the loading of GLS1 has been performed.

The programme MCC of each of these four predetermined TCEs further finds the corresponding primary sublist TCE1/13, TCE14/25, TCE27/39, TCE40/50 in the task list TL1 by means of its own address and the corresponding parameter s. It then subdivides this primary sublist into at most p'+1 secondary sublists of maximum lengths s' by using a formula which is the same as the one given above. Thus the maximum length of the secondary sublists of this primary sublist $$s' = \frac{s + (p' + 1) - 1}{p' + 1}$$

is obtained. When p'=4 the primary sublist TCE1/13 has five secondary sublists TCE1/3, TCE4/6, TCE7/9, TCE10/12 and TCE13 with lengths s' equal to 3, 3, 3, 3 and 1 respectively. Likewise, the primary sublists TCE14/16 and TCE27/39 each have five secondary sublists containing 3, 3, 3, 3 and 1 TCEs respectively, and the primary sublist TCE40/50 has only four sublists containing 3, 3, 3 and 2 TCEs respectively.

It should be noted that this second split is somewhat different from the initial one since one now divides by p'+1 instead of p', as one would expect. Thus, TCE1 is for instance included in the first of the 5 secondary sublists TCE1/3, 4/6, 7/9, 10/12 and 13 obtained by subdividing the primary sublist TCE1/13, although TCE1 has already been loaded previously. However, by proceeding in this way TCE1 can take care of the loading of TCE2 and TCE3 after GLS1 has been transmitted to TCE4, 7, 10, 13 via p'c'≦60 channels. Thus the speed of the loading operation is increased. This would not be so if only TCE2/13 would have been subdivided in sublists since after TCE1 would have transferred GLS1 to say TCE2, 5, 8, 11 it would have remained inoperative.

In an analoguous way as described above, the programme GLS1, the task list TL1 and corresponding parameters s' (3, 3, 3, 1), n=p, p" and c" are then transmitted on c' channels from TCE1, TCE14, TCE27 and TCE40 to each of the first TCEs of the corresponding secondary sublists, except the first one. For instance these information are transmitted from TCE1 to TCE4 (with s'=3), TCE7 (with s'=3), TCE10 (with s'=3) and TCE13 (with s'=1).

Afterwards and again in an analogous way, the length s" of ternary sublists is calculated with the help of s' and p" and is transmitted together with GLS1 and other parameters such as s" from TCE4 to TCE5 and TCE6; from TCE7 to TCE8 and TCE9, and finally from TCE10 to TCE11 and TCE12. Meanwhile TCE1 also calculates a parameter s" and transmits GLS1 to TCE2 and TCE3. The same is true for the other TCEs so that at the end of the iterative or cascaded loading operation the memories of all the TCEs of the set TCE1/q have normally been loaded with the programme GLS1. If this is so their phase indicator PI is on 1.

However, when one of the control elements fails, a number of control elements will not have been loaded with GLS1 and their phase indicator will remain on φ. For instance, when TCE4 fails the control elements TCE5 and TCE6 will not have been loaded. To minimize the effect of such a failure each TCE starts an additional loading operation as soon as GLS1 has been loaded therein and if it has no more cascading work to do. This additional loading operation consists in subdividing the initial task list TL1 by the divisor n=p to get again the same primary sublists as those obtained by TCEA and in then attempting to load partner control elements one at a time. Partner control elements are defined as TCEs which are at homologous positions in the primary sublists. For instance, when TCE18 (18=5 mod 13) starts an additional loading operation, it subdivides the task list TL1 in the 4 primary sublists TCE1/13, TCE14/26, TCE27/39 and TCE40/50 and attempts to load its partners TCE5, TCE31 (31=5 mod 13) and TCE44 (44=5 mod 13) which have not been loaded during the normal loading operation i.e. for which PI is still on φ. Nothing is done in the TCEs for which PI=1.

In this way every TCE which is not faulty attempts to load GLS1 in a number of TCEs via paths different from those via which the loading of these TCEs was attempted during the cascading operation. This means that by the additional loading operation the reliability of the system is considerably increased.

To be noted that due to at least two of the sublists, e.g. TCE1/13, 14/26, 27/39 of a number of sublists TCE1/13, 14/26, 27/39, 40/50 being longer than the other sublists, e.g. TCE40/50 each control element of any of these sublists always has a partner. This would not be the case if there would have been only one longer sublist.

As already mentioned above, while TCEA transmits GLS1 to predetermined control elements of a corresponding initial set of TCEs, TCEB transmits GLS2 to predetermined control elements of another corresponding initial set of TCEs. Afterwards TCEA and TCEB transmit the programmes GLS3, GLS5, . . . etc and GLS4, GLS6, . . . etc., to predetermined control elements of corresponding initial sets of TCEs. When each of the control elements TCEA and TCEB comes to the end of the control list CL, it attempts to load the CLSs normally loaded by the other one, i.e. GLS2, GLS4, . . . and GLS1, GLS3, . . . , into predetermined control elements of corresponding initial sets respectively. This means that by TCEA and TCEB two attempts are made to load a GLS in predetermined control elements of the respective initial sets. As already mentioned, in each control element wherein a GLS has been loaded, the phase indicator is set from $\phi$ to 1 so that TCEA or TCEB only attempts the loading of control elements for which PI is on $\phi$.

The above mentioned data DLS1/n are then loaded in the respective control elements TCE1/n and in each of these which was previously loaded by a GLS1/m the phase indicator PI is then changed from 1 to 2. It should be noted that the data are loaded in the order indicated by a corresponding list wherein DLS1/n are so ordered that the longest cascade should be performed last. In this way a maximum time is provided to load each of the GLSs.

After having thus tried to load the GLSs and GLSs in all the TCEs, TCEA (TCEB) informs its mate TCEB (TCEA) and waits until the latter has finished its loading operation. If this mate TCEB (TCEA) then confirms this end of operation, TCEA (TCEB) restarts all TCEs and informs the mate TCEB (TCEA) of the end of such a restart operation. From the above it follows that which of TCEA and TCEB first finishes a memory loading operation is responsible for restarting the TCEs.

As also mentioned above, the TCEs of each task list such as TL1 are ordered in such a way that the TCE network addresses decrease from top to bottom. This measure and the splitting of the list into sublists used by FLOON and MCC with equally spaced TCEs minimizes the chances of blocking during the cascading operation. Indeed, although it is true that the number of TCEs involved in a cascading operation increases as the cascading progresses, the network addresses of cascaded TCEs, e.g. TCE4 and TCE5, then become less different because the TCEs are ordered in TL1 so that the paths in the DSN between such TCEs become shorter, such paths having a lower blocking probability. Moreover, because the TCEs are reversely ordered and TCEA/B each have a very low network address ABCD with $A=B=C=\phi$ interference is avoided between channels of the same switch of the first stage of the network DS to which e.g. TCEA and several TCEs are connected. Indeed, TCEA may only be connected to a control element having a higher network address via an outgoing channel, whilst the last mentioned TCEs may only be reached from a control element with a higher network address via an incoming channel.

From the above it follows that the transmission of the complete task list TC1 from TCEA to all the TCEs is only required because this list is used in a subsequent additional loading operation. Otherwise it would be sufficient to transmit only the sublist of modules to which a received data packet has to be transmitted. For instance it would be sufficient to transmit to TCE1 only the list TCE1/13.

While the principles of the invention have been described above in connection with specific apparatus, it is to be clearly understood that this description is made only by way of example and not as a limitation on the scope of the invention.

We claim:

1. A method of loading n intercoupled processing modules of a digital switching network having a unique network address for each such intercoupled processing module with each of m different generic load segment data blocks into the random access program control memories of m corresponding predetermined subsets of said n intercoupled processing modules, said method comprising the steps of:

establishing the ordinal sequence in which said m different generic load segment data blocks are to be loaded, creating m initial lists, each corresponding to a respective different one of said m data blocks, for determining the network addresses and the serial and parallel loading sequence in which the program control memories of the corresponding processing modules are to be loaded in pyramidal fashion with each said respective different one data block, and in accordance with the first initial list, transmitting in parallel the first generic load segment data block to each of a corresponding plurality of first-level processing modules and loading the respective program memory of each such first-level module with said first generic load segment data block, said first data block being transmitted to all said corresponding first-level modules together with primary sublist data derived from said first initial list for establishing a respective primary sublist for determining the network addresses and loading sequence for transmitting and loading said first generic load segment data block from each corresponding first-level module's respective program control memory into the program control memories of a respective plurality of second-level and any further-level processing modules to be loaded with said first generic load segment data block, then concurrently in accordance with the corresponding respective primary sublist concurrently transmitting in parallel said first data block from the respective program control memory of each of said first-level processing modules and loading said first data block into the memories of the respective second-level processing modules, said first data block being transmitted to all said corresponding second-level modules together with secondary sublist data derived from the corresponding primary sublist for establishing any required secondary sublist for determining the network addresses and loading sequence for transmitting and loading said first data block into the program control memories of any further-level processing modules from the respective program control memories of each of the second-level processing modules, and in accordance with a second initial list, said second initial list being different from said first initial list, trasmitting in parallel the second generic load segment data block to each of the first-level processing modules designated by said second initial list and loading the respective program memory of each such first-level module with said second data block, said second data block being transmitted to all said corresponding first-level processing modules together with primary sublist data derived from said second initial list for determining the network addresses and loading sequence for transmitting and loading said second data block from each designated first-level module's respective program control memory into the program control memories of a respective plurality of second-level and any further-level processing modules to be loaded with said second generic load segment data.

2. The loading method of claim 1, wherein said plurality of generic load segment data blocks are arranged in a controllist in such a way that the number of iterative steps required to load these generic load segment data blocks in the modules of respective initial sets decreases from top to bottom of said list, at least two successive generic load segment data blocks of said list, starting at the top thereof, are concurrently transmitted in rotation by corresponding ones of at least two respective initialization modules, to the first-level modules of respective initial lists and after any of said initialization modules has finished the loading of all its corresponding generic load segment data blocks into the first-level modules of said respective initial lists, it attempts to load the generic load segment data blocks normally loaded by another of said initialization modules.

3. The loading method of claim 1, wherein each of the processing modules is coupled to said digital switching network via time division multiplex links comprising a plurality of time channels and the general load segment data block is transmitted to a predetermined subset of processing modules simultaneously on a plurality of said channels, together with a parameter indicating the maximum number of channels which may be used by said predetermined module for the transmission of said generic load segment data block to each of other predetermined modules.

4. The loading method of claim 1, further comprising the step of:

subdividing said initial list into a maximum number of sublists equal to the maximum number of first-level processing modules to which said first generic load segment data block is to be simultaneously transmitted, each such sublist including the network address of a corresponding one of said first-level processing modules, to thereby form said primary sublists.

5. The loading method of claim 1, further comprising the step of:

subdividing each said respective primary sublist into a maximum number of secondary sublists equal to one plus the maximum number of processing modules to which said first generic load segment data block is to be simultaneously transmitted from said respective memory, whereby a particular previously loaded first-level module, after it has loaded said maximum number of second-level modules associated with said secondary sublists, may thereafter itself load one or more third-level modules in accordance with the remaining said secondary sublists concurrently with the loading of other third-level modules from said second-level modules, thereby further speeding up the loading process.

6. The loading method of claim 5, further comprising the steps of transmitting said first data block to predetermined second-level modules of the sublists which do not include said previously loaded first-level module and thereafter transmitting from said previously loaded first-level module said data block directly to predetermined third-level modules of the sublist of which it forms part.

7. The loading method of claim 1, wherein said modules are intercoupled through a multi-stage digital switching network, said modules each have an address which comprises a number of digits equal to the number of stages of said network and which is able to control path set up in respective ones of said stages and in each of said initial lists and said sublists the modules thereof are ordered according to their network addresses.

8. The loading method of claim 7, wherein said network addresses of the modules to be successively loaded with a given generic load segment are ordered in a decreasing network address order, with the first modules on any given initial list or given sublist being the first to be loaded and with each sublist associated therewith being a contiguous portion of said given initial list or given sublist, whereby a relatively large path length will result between the different first-level modules and also between the modules on different primary sublists, and whereby, as the number of modules concurrently involved in the loading process increases, the average path length from a module then transmitting the generic load segment data to the moduls then being loaded therewith decreases.

9. The loading method of claim 1, wherein said initial list is transmitted to each first-level module and the modules initially loaded from said each first-level module together with a first set of parameters indicating the maximum number of lower-level modules to be simultaneously loaded from a higher-level module and the total number of modules to be directly or indirectly laded from the receiving module in successive levels of a cascaded initial loading operation, from which the lists and sublists associated with subsequent initial loading operations from said each module may be derived, as well as a further parameter from which may be derived from said initial list other primary sublists associated with initial loading operations from other said first-level modules, and after its memory has been loaded, each module on a given said primary sublist uses said further parameter to derive all the other said primary sublists from said initial list and attempts during an additional memory loading operation to load said generic load segment data block into any homologous module of each of these other sublists.

10. The loading method of claim 9, wherein at least two of said primary sublists have a same length larger than the length of the other primary sublists, whereby each said module will load a corresponding said homologous module on at least one of said primary sublists.

11. The loading method of claim 9, wherein the memory of each of said modules to be loaded stores a phase indicator which is set to a first predetermined condition when the memory has been loaded with its corresponding generic load segment data block to thereby prevent a renewed loading of said memory during said additional memory operation.

12. The loading method of claim 10, wherein all but at most one of said primary sublists have said larger length, whereby each said module on a given primary list will have corresponding said homologous modules on all but at most one of the other said primary sublists.

* * * * *

UNITED STATES PATENT AND TRADEMARK OFFICE
CERTIFICATE OF CORRECTION

PATENT NO. : 4,866,668

DATED : September 12, 1989

INVENTOR(S) : M.P. Edmonds, et al

It is certified that error appears in the above-identified patent and that said Letters Patent is hereby corrected as shown below:

```
Column 4, line 1, delete "which".

Column 6, line 12, after "considered" insert a comma.
Column 6, line 14, change "in" to -- is --.
Column 6, line 43, after "s" delete the double dots and
                   insert a period.
Column 7, line 62, change "14/16/" to -- 14/26 --.
Column 8, line 13, change "analoguous" to -- analogous --.
Column 9, line 32, change "GLSs" to -- DLSs --.
Column 9, line 58, change "DS" to -- DSN --.
```

UNITED STATES PATENT AND TRADEMARK OFFICE
CERTIFICATE OF CORRECTION

PATENT NO. : 4,866,668

DATED : September 12, 1989

INVENTOR(S) : M.P. Edmonds, et al

It is certified that error appears in the above-identified patent and that said Letters Patent is hereby corrected as shown below:

In the Claims

Column 10, line 66, change "trasmitting" to -- transmitting --.
Column 11, line 16, change "controllist" to -- control list --.
Column 12, line 13, after "forms" insert -- a --.
Column 12, line 39, change "moduls" to -- modules --.
Column 12, line 48, change "laded" to -- loaded --.

Signed and Sealed this

Thirteenth Day of August, 1991

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,866,668

DATED : September 12, 1989

INVENTOR(S) : Mark P. Edmonds; Anthony Donegan

It is certified that error appears in the above-identified patent and that said Letters Patent is hereby corrected as shown below:

Column 2, line 52, change "any of them has finished" to
-- finishing --.
Column 4, line 8, change "bothway" to -- two way --.
Column 7, line 41, change "parameters" to -- parameter --.
Column 8, line 19, change "these information are" to
-- this information is --.

Signed and Sealed this

Seventh Day of January, 1992

Attest:

HARRY F. MANBECK, JR.

Attesting Officer

Commissioner of Patents and Trademarks